3,737,552
METHOD OF TREATING GONORRHEA
Harry W. Gordon, Bronx, and Paul B. Wasserstein, Flushing, N.Y., assignors to Julius Schmid, Inc., New York, N.Y.
No Drawing. Filed July 22, 1971, Ser. No. 165,330
Int. Cl. H61k 27/00
U.S. Cl. 424—313                                 9 Claims

ABSTRACT OF THE DISCLOSURE

A method of treating gonorrhea is described which comprises administering to a human either locally or orally an effective amount of a salt of dioctyl sulfosuccinate.

---

This invention relates to a method of treating *Neisseria gonorrhea*.

The medicines currently available to treat gonorrhea are oxytetracycline and penicillin, both of which are administered systemically. Systemic administration has its drawbacks particularly where the infection is localized and therefore would be better treated by a topically or locally administered drug. An additional drawback to the systemic administration of penicillin or oxytetracycline is the allergic sensitivity of many individuals to these antibiotics.

It has now been discovered that an alkyl sulfonate selected from the group consisting of the ammonium, sodium, potassium, magnesium, calcium or aluminum hydroxide salts of dioctyl sulfosuccinate is effective in treating *Neisseria gonorrhea*.

Among these dioctyl sulfosuccinate compounds, dioctyl sodium sulfosuccinate (sodium-bis (2-ethylhexyl) sulfosuccinate) is well known in industry as a versatile anionic surface active agent and has also been recognized officially as an ingredient in medicaments in the U.S. Pharmacopeia (Rev. 18, p. 205), Mack Publishing Co., Easton, Pa. Dioctyl sodium sulfosuccinate (hereinafter referred to as DSS) has a low order of toxicity, excellent stability and is widely employed either alone or as an adjuvant in the prevention and treatment of constipation in mammals. McDonald and Tadum reported in the Journal of Immunology (Baltimore, vol. 59, pp. 301–308, 1948) that dioctyl sodium sulfosuccinate was one of four surface active agents which successfully attack *Trichomonas vaginalis*, a parasite of the human genital tract. The microbe responsible for this infection is a protozoa. It has now been found that DSS is useful for local and per oral treatment of infections caused by the microbe responsible for gonorrhea.

Accordingly, one aspect of the present invention is to provide a method of treating gonorrhea in a human. Another aspect of the present invention is to provide a method of locally treating gonorrhea in a human.

A further aspect of the instant invention is to provide a method of orally treating gonorrhea in a human.

These and other aspects of the present invention will become apparent from the following description:

The dioctyl sulfosuccinate salts used according to this invention are alkyl sulfonate type molecules of the general formula R—$SO_2$—OX, where X is selected from the group consisting of sodium, potassium, calcium, ammonium, or aluminum hydroxide. The polar or hydrophilic portion of the molecule ($SO_2$—OX), generally ensures fairly good solubility of the molecule. The invention will be further described with reference to DSS, the preferred medicament for treatment of gonorrhea. DSS is soluble, in varying degrees, in water and in organic liquid. Although DSS dissolves slowly in cold water, its solubility in water increases directly with increase in temperature. An aqueous solution of DSS is conveniently prepared by adding solid DSS to distilled water and applying gentle heat. At this time water can be added to the solution to adjust the concentration of DSS to the desired level. An alternative method of preparing an aqueous DSS solution is to soak solid DSS overnight in distilled water. The concentration level of DSS can then be adjusted by slowly adding more water with gentle heating and stirring.

For local treatment of gonorrhea in humans, DSS or any of the aforementioned salts of dioctyl sulfosuccinate may be used in dilute solution. DSS is commercially available as a 1% aqueous composition or as a solid (pharmaceutical grade—DSS–NF). Either the aqueous or the solid DSS composition can be diluted with water to provide a minimum concentration of about 0.001% DSS in aqueous solution, the preferable minimum concentration for use in this invention being 0.005% DSS in aqueous solution. Lower concentrations may be used but they result in somewhat longer killing times. The foregoing aqueous sulfosuccinate salt solutions may be applied locally to treat gonorrhea. Any of the well known modes of local administration including spraying, douche, aerosol spray and ointment formulations may be employed.

The dioctyl sulfosuccinate salts described herein, and in particular DSS, may also be administered orally to treat gonorrhea in humans. The preferred mode of oral administration is in solid form although aqueous suspensions or syrup formulations can also be employed. In solid form, the active ingredient is contained in a capsule or tablet. The quantity of effective dose supplied by each capsule or tablet is relatively unimportant since the total dosage can be reached by administration of either one or a plurality of capsules or tablets or both. The preferable form of oral administration is in capsule form. The effective oral dosage of dioctyl sulfosuccinate derivatives for use in this invention depends upon the severity of condition, the stage and individual infective characteristics of each human being treated: for example, the preferred DSS compositions will generally be orally administered in a dosage range from about 1 mg. to about 500 mg. DSS per day, and preferably from about 10–300 mg. DSS per day.

In a clinical situation, two humans suffering from gonorrhea each received 200 mg. DSS daily in the form of 50 mg. capsules for one day. Complete remission of *Neisseria gonorrhea* was noted within 24 hours in both cases as tested by clinical culturing.

The following example is illustrative of the preparation of a composition used in accordance with the present invention.

EXAMPLE

One part by weight of dioctyl sodium sulfosuccinate NF (dry basis) was dissolved in distilled water to a concentration of 0.5% DSS solution, while half the foregoing solution was diluted ten-fold with distilled water to provide a 0.05% DSS solution. The foregoing solutions were tested to determine their effect upon five clinically isolated strains of *Neisseria gonorrhea*.

Two petri dishes containing confluent to near confluent growth of each strain were washed off with two ml. of brain heart infusion broth medium. From each of these ten plates the resulting washings were placed into sterile test tubes. From each of these samples, aliquots were taken to determine by plate count the viable number of microorganisms present.

Viable plate counts revealed these suspensions to be of the order of $10^9$ bacterial cells/ml. For each strain of *N. gonorrhea*, a duplicate set of tubes were set up to which were added to following:

(a) 9 ml. of brain heart infusion
(b) 1 ml. of DSS (0.5% solution or 0.05% solution)

Final testing concentration of DSS in the above tubes was therefore 0.05% and 0.005% respectively.

(c) 0.1 ml. of the plate washed suspensions.

At appropriate times, two loopfuls of each of the above ten (10) mixes (a)+(b)+(c) (4 mm. diameter Nicchrome wire loop, 24 gauge) were transferred to one ml. of brain heart infusion broth medium in a test tube to dilute out the DSS. From this dilution one loopful was plated to a Thayer-Martin chocolate agar plate and incubated under 5% carbon dioxide tension for 24 hours after which time the growth response was recorded. Corresponding controls for each of the strains tested were diluted as per the above testing method in 0.85% physiological saline. Aliquots were plated after 30 minutes.

In order to determine the effects of dilution upon the microorganism, by the testing method above, the following procedure was initiated. Viable bacterial counts were made by plating aliquots of appropriate dilution of the concentrated plate washings of the gonorrhea test organisms. These values were compared to plate counts obtained from cultures diluted as described above.

Viable counts of the stock concentration read $10^9$ cells per ml. Ten million ($10^7$) cells/ml. however, were obtained by straight dilution in saline as in the controls. Dilution therefore reduced the count by a factor of 100. Similarly the subsequent 1.10 dilution intended to dilute out the active agent effectively reduced the titer to $10^6$ cells/ml.

Results indicate that $10^9$ viable cells/ml. were killed within one minute or less exposure to the above concentrations, for each of the strains of gonorrhea tested. Discounting the effect of dilution as described supra, a net kill of approximately $10^6$ bacterial cells/ml. therefore is achieved.

The compositions described herein are administered to treat localized gonorrhea infections such as in the genital and anal areas.

What is claimed is:

1. A method of treating gonorrhea in a human afflicted with said condition which comprises administering to said human an effective amount for treating gonorrhea of an alkyl sulfosuccinate selected from the group consisting of the sodium, potassium, calcium, magnesium, ammonium and aluminum hydroxide salts of dioctyl sulfosuccinate.

2. A method according to claim 1 wherein said alkyl sulfosuccinate is dioctyl sodium sulfosuccinate.

3. A method according to claim 2 wherein said dioctyl sodium sulfosuccinate is administered locally.

4. A method according to claim 2 wherein said dioctyl sodium sulfosuccinate is present in at least a 0.005% aqueous solution.

5. A method of treating gonorrhea in a human afflicted with said condition which comprises topically applying to said human in the infected area an effective amount for treating gonorrhea of a dilute aqueous solution of dioctyl sodium sulfosuccinate.

6. A method according to claim 5 wherein said dioctyl sodium sulfosuccinate is administered in an aqueous suspension.

7. A method of treating gonorrhea in a human afflicted with said condition which comprises orally administering to said human an effective dose for treating gonorrhea of dioctyl sodium sulfosuccinate.

8. A method according to claim 7 wherein said dioctyl sodium sulfosuccinate is administered in a solid form selected from the class consisting of a capsule and a tablet.

9. A method of treating gonorrhea in a human afflicted with said condition which comprises orally administering to said human from about 1 mg. to about 500 mg. per day of dioctyl sodium sulfosuccinate.

References Cited

The Merck Index, 8th edition, 1968, Merck & Co., Inc., Rahway, N.Y., pp. 382 and 383.

JEROME D. GOLDBERG, Primary Examiner